United States Patent [19]

Sherwood et al.

[11] Patent Number: 4,765,504
[45] Date of Patent: Aug. 23, 1988

[54] VAPOR VENTING VALVE FOR VEHICLE FUEL SYSTEM

[75] Inventors: Carl H. Sherwood, Brockport; Joseph Fornuto, Rochester, both of N.Y.; Roy A. Giacomazzi, Washington Township, Macomb County, Mich.

[73] Assignee: General Motors Corporation, Detroit, Mich.

[21] Appl. No.: 91,124

[22] Filed: Aug. 31, 1987

[51] Int. Cl.⁴ .............................................. B65B 31/06
[52] U.S. Cl. .................................. 220/86 R; 141/59; 220/85 VS
[58] Field of Search ............ 220/85 F, 85 US, 85 UR, 220/86 R; 141/59, 301, 302

[56] References Cited

U.S. PATENT DOCUMENTS

| | | | |
|---|---|---|---|
| 4,630,749 | 12/1986 | Armstrong | 220/86 R |
| 4,706,708 | 11/1987 | Fornuto | 141/59 |
| 4,707,164 | 11/1967 | Harris | 220/86 R |
| 4,714,172 | 12/1987 | Morris | 220/86 R |
| 4,715,509 | 12/1987 | Ieo | 220/86 R |
| 4,724,861 | 2/1988 | Covert | 220/86 R |

Primary Examiner—George E. Lowrance
Attorney, Agent, or Firm—Patrick M. Griffin

[57] ABSTRACT

A vapor venting means for a vehicle fuel system in which one ball valve serves both the close off function between fuel fills, and the automatic shut off function during fuel fill, but does not depend upon falling under its own weight in order to open the vapor vent path to the canister. The ball valve is indirectly loaded against a lower valve seat, which is spaced from an upper spring seat, through the use of a spring loaded carrier that normally traps the ball valve against the lower seat. Then, when the nozzle is inserted, the carrier is pushed up so that the ball valve is freed without having to fall under its own weight. Since the ball valve is not confined or limited, it can also float up against the upper spring seat in the event of fuel overfill.

3 Claims, 2 Drawing Sheets

VAPOR VENTING VALVE FOR VEHICLE FUEL SYSTEM

This invention relates to vehicle fuel systems in general, and specifically to a vapor venting valve for preventing the escape to atmosphere of fuel vapors produced during the fuel fill process.

BACKGROUND OF THE INVENTION

Current and proposed future vehicle fuel vapor emission standards continue to stimulate new proposals and designs for the control, storage and disposal of fuel vapors. These vapors include both those normally displaced out of the tank to atmosphere as fuel enters the tank, the so called fuel fill losses, and pressurized fuel vapors that are naturally formed in the tank, and which escape as soon as the gas cap is removed, the so called puff losses. Such designs are now reflected in the issued U.S. patents, designs which are now beginning to be modified and improved.

An example is found in U.S. Pat. No. 4,630,749 to Armstrong et al, assigned to the assignee of the present invention. As disclosed there, the lower part of a housing opens through the filler neck below a swinging flapper door near the top of the filler neck, which is pushed open by the insertion of the fuel nozzle. A vent line from the top of the housing runs to a standard vapor storage canister. The inserted nozzle passes through a wiping seal, blocking the normal vapor exit path to atmosphere. Vapors can instead exit only through the housing and vent line to the storage canister. One desired function of such a vent means is that the vent line should be closed off at times other than during the fuel fill process. To accomplish this, a first ball valve within the housing is continually spring loaded down to close off the exit path. The ball valve is pushed up by a finger on the flapper door as it is pushed open, compressing the spring, and opening up the exit path. Another desired function is that the vapor exit path should be automatically shut off in the event that liquid fuel rises to the level of the housing, so that raw fuel does not reach the storage canister. This is accomplished by the provision of a second, buoyant ball valve, which floats up at the upper interior of the housing to shut off the exit path if liquid fuel reaches it enters. While the use of a second ball valve inevitably take greater volume than would just one, the first ball valve cannot also serve as a shut off, since it is immobilized between the flapper door and the compressed spring and cannot float freely.

It is known, in general, to make a single ball serve both the close off function before fuel fill, and the automatic shut off function during fuel fill. This may be done by using a lever extension on the flapper door, or some other retention structure that is released by the removal of the gas cap, to hold a buoyant ball valve up against a seat. Then, upon removal of the gas cap, or upon insertion of the fuel nozzle through the flapper door, the buoyant ball falls down under its own weight to a lower position below the seat, opening up the vapor venting path to the canister. Should liquid fuel rise that high, then the buoyant ball can float up to shut off the exit path. An inevitable limitation of such systems is that, since the ball is very light, gravity does not provide a great deal of force to pull it down off of the seat. Consequently, the stickier and more effective seat surfaces cannot be used, at least not without some additional mechanism to kick the lightweight ball off of the upper seat as the nozzle is inserted to assure opening of the vapor path.

SUMMARY OF THE INVENTION

The invention provides a new vapor venting means which allows a single ball valve to serve both functions described above, but without the limitations noted above.

In the preferred embodiment disclosed, a valve housing has a lower wall presented to the interior of the filler pipe and an upper wall spaced from the lower wall. The lower wall has a circular lower seat opening to the interior of the filler pipe and the upper wall has a circular upper seat opposed to the lower seat and opening to the outside of the housing. A vapor vent line runs from the upper seat to the storage canister. Inside the filler pipe, between the lower seat and the upper end of the filler pipe, is a wiping seal that is engageable with the inserted fuel filler nozzle, and a flapper door that is pushed open by the fuel nozzle in conventional fashion. Consequently, the spaced upper and lower seats through the housing and the vent line provide the only vapor exit path from the interior of the filler pipe during fuel fill.

A lightweight, buoyant ball valve located between the opposed seats can block off either seat when it is engaged therewith, but is normal loaded against the lower seat between fuel fills. Rather than spring loading the ball directly down against the lower seat, however, this is done indirectly, through the use of an intermediate ball valve carrier located in the housing interior between the ball valve and the upper seat. The carrier has a generally circular central opening through which the ball cannot pass, so that it traps the ball valve against the lower seat, normally closing off the exit path between fuel fills. A pair of lift rods on the carrier extend through the lower housing wall to the interior of the filler pipe. When the nozzle is inserted, the ball valve carrier allows the ball to be freed from the lower seat to open the vapor exit path without directly engaging or confining the ball. This is accomplished by an actuating member on the flapper door that hits the carrier lift rods, lifting the carrier up away from the lower seat far enough that the ball can float up to the upper seat. The ball will continue to sit on the lower seat, but is light enough that vapors can push it up and escape to the storage canister. Since the ball valve is also buoyant, should overfill occur, the rising fuel will float it up into engagement with the upper seat to automatically shut off the path to the storage canister.

It is, therefore, a general object of the invention to provide a vehicle fuel system with a vapor venting means that uses a single ball valve for both the between fill close off function and the automatic overfill shut off function, without the need for the ball valve to fall under its own weight away from a seat in order to open up the vapor exit path to the storage canister.

It is another object of the invention to provide such a vapor venting means in which the ball valve is indirectly held against a lower seat by a spring loaded carrier to close off the exit path before fuel nozzle insertion, and is freed from the lower seat upon nozzle insertion by lifting the carrier away from the lower seat, lifted far enough that the ball can in turn float up far enough, in the event of fuel overfill, to engage an upper seat.

It is yet another object of the invention in which the carrier, which holds the ball valve against the lower seat, is inside a housing that contains the ball valve, but is remotely actuatable from outside the housing so as to free the ball valve from the lower seat and open the vapor exit path to the canister without allowing vapors to enter the housing except through the lower seat.

DESCRIPTION OF THE PREFERRED EMBODIMENT

These and other objects and features of the invention will appear from the following written description, and from the drawings, in which.

Figure 1:
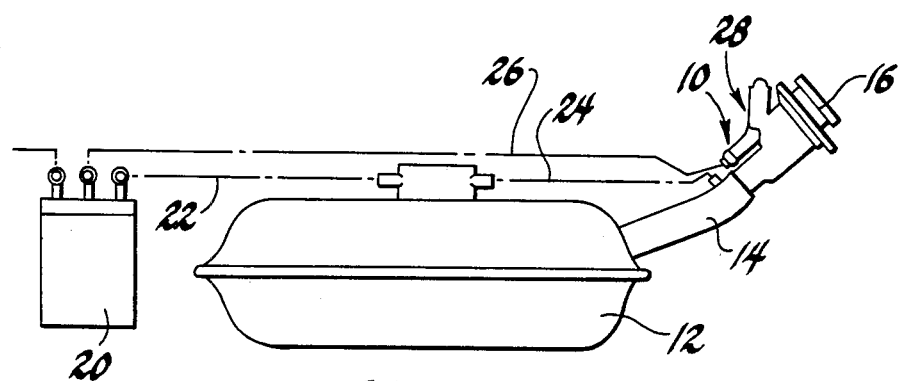
FIG. 1 shows a preferred embodiment of the vapor venting means of the invention in a vehicle fuel system having a fuel tank and filler pipe with an upper end that is openable to atmosphere, and a vapor storage canister.
Figure 3:
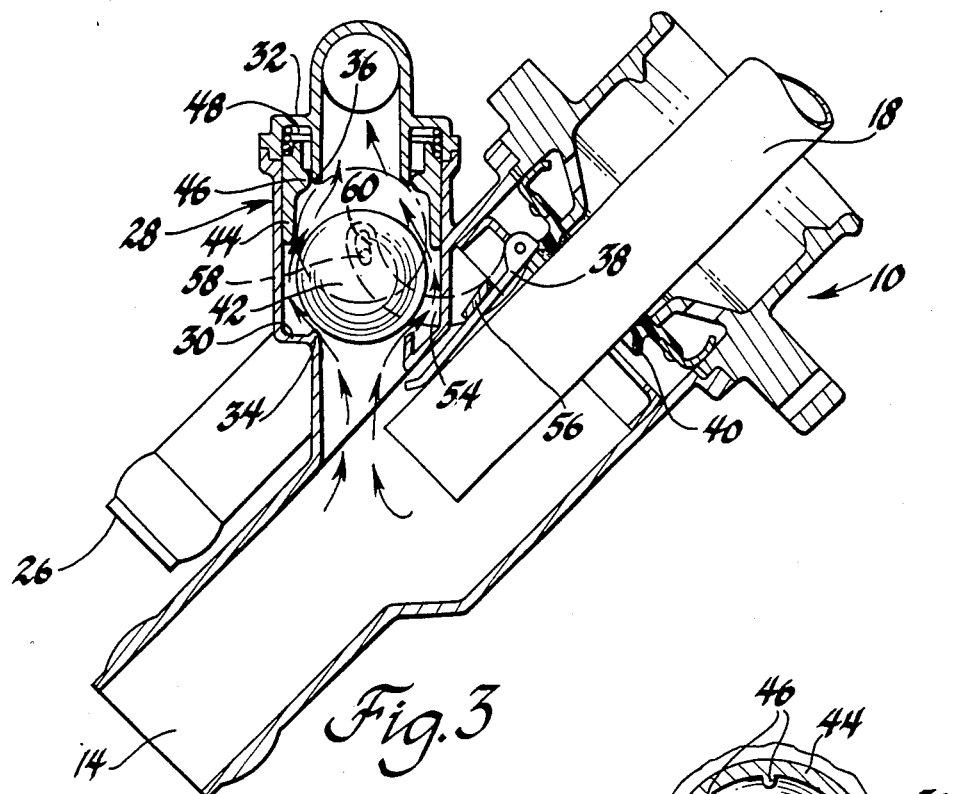
FIG. 3 is a view similar to FIG. 2, but after the nozzle has been inserted, and showing the normal, close off position of the ball valve in solid lines and the overfill, shut off position in dotted lines.

Referring first to FIGS. 1 and 3, a preferred embodiment of the vapor venting means of the invention, designated generally at 10, is shown for use in a vehicle fuel system having a fuel tank 12 with a fuel tank filler pipe 14. The upper end of filler pipe 14 is closed by a conventional cap 16, which is removable so as to open filler pipe 14 to receive a liquid fuel filler nozzle 18. A conventional vapor storage canister 20 is fed by a diurnal loss line 22, through a suitable restriction and tank pressure control valve, not shown, to recover vapors produced in tank 12 as it sits between fillings. A separate and unrestricted line 24 runs from tank 12 through filler pipe 14 just below the preferred embodiment of the invention 10, and provides the first leg of a recovery path for fuel vapors displaced from tank 12 during the fuel fill operation. The second leg of that path is provided by an unrestricted vapor venting line 26 running from the preferred embodiment 10 to the storage canister 20. The opening and closing of the path is controlled by the invention, as will be described below.

Figure 2:
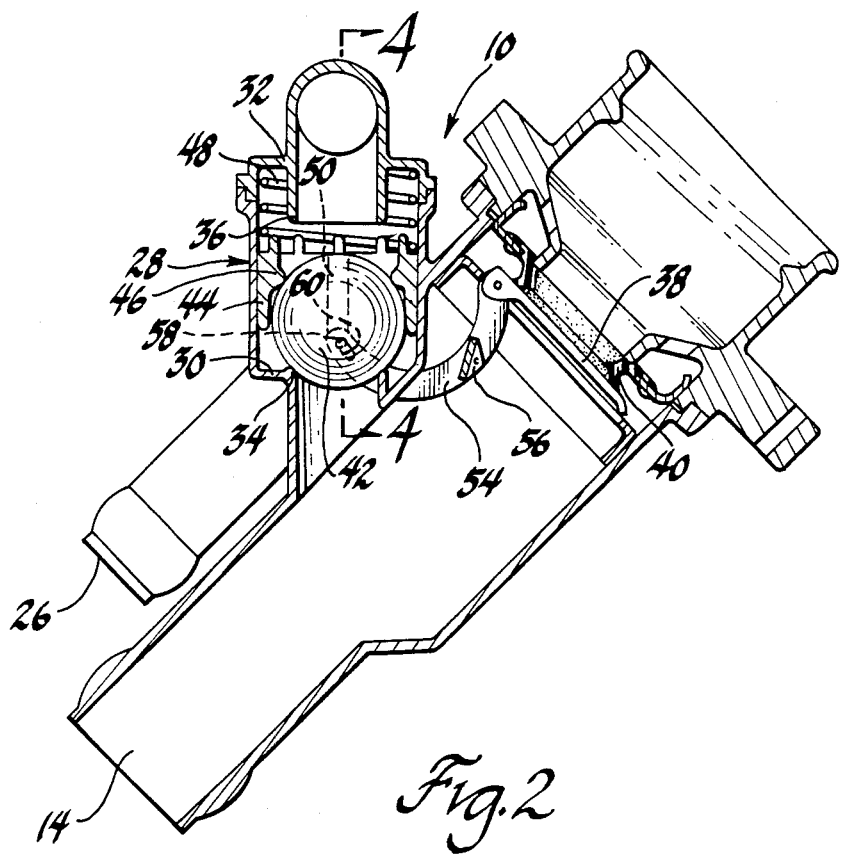
FIG. 2 shows a cross section through the upper end of the fuel tank filler pipe and the preferred embodiment of the invention, after the filler pipe has been opened, but before the fuel nozzle has been inserted.
Figure 4:
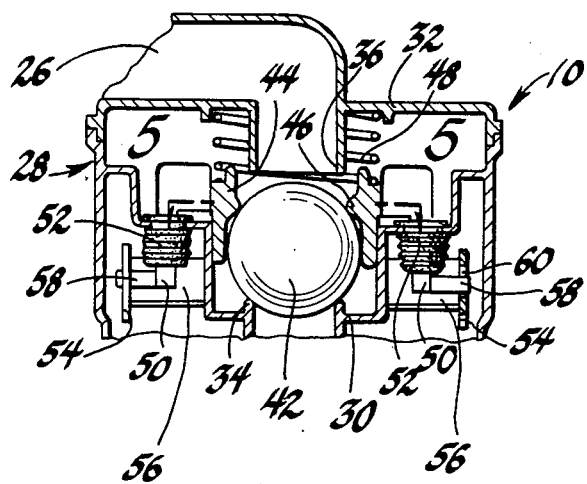
FIG. 4 is a cross section of the preferred embodiment taken 90 degrees to the cross section in FIG. 2.

Referring next to FIGS. 2 and 4, a valve housing, designated generally at 28, is located on filler pipe 14, between the upper end of filler pipe 14 and the opening of line 24. Housing 28 could be metal, but would more advantageously be molded of a hard, durable and vapor resistant plastic. The interior of housing 28 is bounded by a lower wall 30 of stepped cylindrical shape, which is presented to the interior of filler pipe 14, and a generally flat upper wall 32 spaced from the lower wall 30. Housing lower wall 30 defines a circular lower seat 34 opening to the interior of filler pipe 14, and upper wall 32 defines an opposed circular upper seat 36 opening to the outside of the valve housing 28. Vent line 26 opens to upper seat 36. The spaced seats 34 and 36, therefore, when they are both open, provide a vapor exit path from the interior of filler pipe 14 to canister 20. The upper end of filler pipe 14 is closed by a flapper door 38 hinged to the interior of filler pipe 14 and spring biased by a return spring, not shown, to swing counterclockwise to the closed position illustrated in FIG. 2. In the closed position, flapper door 38 tightly engages the underside of a circular seal 40. Circular seal 40 is sized so as to tightly receive the nozzle 18 therethrough. Therefore, even after the removal of cap 16 and the insertion of nozzle 18, the spaced seats 34 and 36 and vapor vent line 26 provide the only fuel vapor exit path from the interior of filler pipe 14. The spaced seats 34 and 36 are selectively closed off and opened by structure described next.

Figure 5:
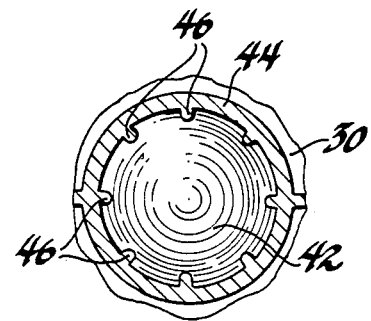
FIG. 5 is a sectional view taken along the line 5—5 of FIG. 4.

Referring next to FIGS. 4 and 5, a lightweight and buoyant ball valve 42 is contained within housing 28, between the opposed seats 34 and 36. The diameter of ball valve 42 is sufficient to engage and block either of the seats 34 or 36 to block the vapor exit path through line 26, but is smaller than the spacing between seats 34 and 36, and so cannot block both at once. Ball valve 42 is normally biased against the lower seat 34, but not directly. An intermediate ball valve carrier 44 is used instead, which is generally annular in shape with a circular central opening defined by a series of circumferentially spaced ribs 46. The outside of carrier 44 rides in the innermost cylindrical part of lower wall 30 so as to be guidably movable up and down, toward and away from the opposed seats 34 and 36. Ribs 46 engage the outside surface of ball valve 42 above its equator, under the force of a compression spring 48 loaded against the upper wall 32. Ball valve 42 is thereby trapped between ribs 46 and lower seat 34. Thus, before the insertion of nozzle 18, vapors may flow to canister 20 from tank 12 through the restricted diurnal loss line 22, but not through the unrestricted path of the lines 24 and 26, which is blocked by the ball valve 42-lower seat 34 seal. The surface of lower seat 34 is a relatively hard material, and not as conducive to tight sealing, as a softer and tackier material, like rubber. Nevertheless, the force of spring 48 may conveniently be made strong enough to in turn push ball valve 42 into lower seat 34 with enough force to give a tight seal without jeopardizing venting during fuel fill, as will appear below.

Referring next to FIGS. 3 and 4, a remotely actuatable lifter allows the vapor exit path to the canister 20 to be opened during fuel fill, without directly engaging, trapping or otherwise confining ball valve 42. A pair of lift rods 50, integral with or otherwise fixed to carrier 44, extend through lower wall 30 on either side of lower seat 34, into the interior of filler pipe 14. A pair of bellows seals 52 crimped around the lift rods 50 seal the area where they extend through the lower wall 30, to prevent the passage of vapors through the lower housing wall 30. A two sided swinging lever 54 is pivoted to the inside of filler pipe 14 so as to swing about the same axis as, but independently of, the flapper door 38. Lever 54 is also spring biased by a return spring, not shown, to swing counterclockwise to the position shown in FIG. 2. Each side of lever 54 has generally a C shape, and the two sides are kept rigidly spaced by a cross bar 56, spaced far enough apart that the flapper door 38 can fit therebetween. The ends of the two spaced sides of lever 54 are joined to the carrier 44 by pins 58 on the lift rods 50, which captured within slots 60 in the ends of the two spaced sides of lever 54.

Referring next to FIGS. 2 and 3, after cap 16 is removed, but before insertion of the fuel nozzle 18, the ball valve 42 is in the normal, close off position shown in FIG. 2. Furthermore, the tight engagement of the flapper door 38 with the underside of circular seal 40 prevents any pressurized, puff loss vapors that might have existed in filler pipe 14 from exiting to atmosphere when cap 16 is first removed. At the start of the fuel fill operation, fuel nozzle 18 is received tightly through circular seal 40, and then begins to swing open the flapper door 38, finally pushing it to the open position shown in FIG. 3. During most of the swinging open motion of flapper door 38, it moves freely between the two spaced sides of lever 54. Before door 38 reaches the fully open position of FIG. 3, however, it hits the cross bar 56, swinging lever 54 from its FIG. 2 to its FIG. 3 position. Concurrently, the lift rods 50 are pushed through the housing lower wall 30 as the bellows seals 52 collapse and carrier 44 is lifted up and away from the lower seat 34, compressing the spring 48, freeing ball valve 42. The clearance between the pins 58 and the slots 60 gives enough play or travel to match the arcuate motion of the ends of the swinging lever 54 to the linear motion of the sliding carrier 44. Ball valve 42 need not fall away from any sealing surface under its own weight in order to free itself, and spring 48 can therefore be made relatively strong, without jeopardizing the opening up of the vapor exit path. While ball valve 42 remains sitting on lower seat 34, the fact that the material which comprises lower seat 34 is not tacky and the fact that ball valve 42 is light means that just retracting carrier 44 is enough to allow vapors in the filler pipe 14 to lift it and exit to canister 20. These vapors in filler pipe 14 may be the puff loss vapors already present, or they may be vapors that enter filler pipe 14 directly from the tank 12, or those displaced out of the tank 12 as it is filled, which enter filler pipe 14 indirectly through line 24. Carrier 44 is moved up far enough by the swinging lever 54 that ball valve 42 can engage the upper seat 36 freely, without engaging the ribs 46. This allows the ball valve 42 to serve the other of the two functions noted above, the overfill shut off function. Any liquid fuel rising within the filler pipe 14 far enough to enter housing 28 and reach ball valve 42 will float it up and into engagement with the upper seat 36, which will also block the exit path, preventing any raw fuel from reaching canister 20 through line 26.

Variations of the preferred embodiment 10 may be made within the broader confines of the basic invention. For example, some remote acting means other than the swinging lever 54 could be used to lift the carrier 44 up, such as as repellent magnets, one on carrier 44 and one on flapper door 38. The ends of the swinging lever 54 could be designed to punch through resilient slit seals in the housing lower wall 30 before hitting carrier 44, thus providing the lifting function without the necessity for the collapsible bellows seals 52. A biasing means for carrier 44 other than coil spring 48 could be used, although it is particularly advantageous in the embodiment disclosed, loaded between the housing upper wall 32 and the carrier 44. Therefore, it will be understood that the invention is not intended to be limited to just the preferred embodiment 10 disclosed.

The embodiments of the invention in which an exclusive property or privilege is claimed are defined as follows:

1. In a vehicle fuel system having a fuel tank, a fuel tank filler pipe the upper end of which is openable to atmosphere to receive a liquid fuel filler nozzle, and a vapor storage canister, a vapor venting means to prevent fuel vapors produced during fuel fill from exiting said fuel tank through said filler pipe to atmosphere, said vapor venting means comprising, a valve housing on said filler pipe below said filler pipe upper end having an upper circular seat opening to the outside of said housing and an opposed, spaced lower circular seat opening to the interior of said filler pipe, a vapor vent line running from said upper circular seat to said storage canister so as to provide a vapor exit path from the interior of said filler pipe in conjunction with said spaced upper and lower seats, a lightweight and buoyant ball valve in said housing intermediate said opposed seats and having a diameter that is less than the spacing between said opposed seats, so that said ball valve can close either said lower or said upper seat to block said exit path, a ball valve carrier in said housing intermediate said ball valve and said upper circular seat and guidably movable toward and away from said opposed seats, biasing means continually forcing said carrier into said ball valve and toward said lower seat so as to block said exit path, a remotely actuatable carrier lifter within said housing that is movable from outside of said housing to lift said carrier away from said lower seat against said biasing means and toward said upper seat, an actuator within said filler pipe movable by the insertion of said fuel filler nozzle to actuate said carrier lifter and push said carrier away from said lower seat sufficiently that said ball valve may float into engagement with said upper seat without engaging said carrier, and, seal means intermediate said valve housing and said filler pipe upper end and engageable with said inserted fuel filler nozzle to block exit of vapors from said filler pipe upper end, whereby, before insertion of said fuel nozzle, said ball valve will block said lower seat and prevent vapors from exiting said filler pipe, and after insertion of said fuel nozzle, said carrier will be lifted away from said lower seat to free said ball valve, allowing vapors produced during fuel fill to lift said lightweight ball valve from said lower seat so that said vapors can exit only through said lower and upper seats to said upper seat and vent line to said canister, while any liquid fuel rising within said filler pipe to said ball valve will float said ball valve into engagement with said upper seat to block said exit path.

2. In a vehicle fuel system having a fuel tank, a fuel tank filler pipe the upper end of which is openable to atmosphere to receive a liquid fuel filler nozzle, and a vapor storage canister, a vapor venting means to prevent fuel vapors produced during fuel fill from exiting said fuel tank through said filler pipe to atmosphere, said vapor venting means comprising, a valve housing on said filler pipe below said filler pipe upper end having an interior bounded by a lower wall presented to the interior of said filler pipe and an upper wall spaced from said lower wall, said lower wall further defining a circular lower seat opening to the interior of said filler pipe and said upper wall further defining an opposed circular upper seat opening to the outside of said valve housing, a vapor vent line running from said upper circular seat to said storage canister so as to provide a vapor exit path from the interior of said filler pipe in conjunction with said spaced upper and lower seats, a lightweight and buoyant ball valve located in said housing interior intermediate said opposed seats having a diameter that is less than the spacing between said opposed seats, so that said ball valve can close either said lower or said upper seat to block said exit path, but not both simultaneously, a ball valve carrier located in said housing interior intermediate said ball valve and said upper circular seat and guidably movable toward and away from said opposed seats, said carrier having a generally circular central opening therethrough with a circumference less than the greatest circumference of said ball valve, a compression spring biased between said upper housing wall and said carrier so as to trap the outside of said ball valve within said carrier opening and close said lower seat, a carrier lifter extending through said lower housing wall to the interior of said filler pipe, seal means between said carrier lifter and said lower housing wall to prevent the passage of vapor through said lower housing wall along said carrier lifter, an actuator within said filler pipe movable by the insertion of said fuel filler nozzle to actuate said carrier lifter and push said carrier away from said lower seat sufficiently that said ball valve may float into engagement with said upper seat without engaging said carrier, and, seal means intermediate said valve housing and said filler pipe upper end and engageable with said inserted fuel filler nozzle to block exit of vapors from said filler pipe upper end, whereby, before insertion of said fuel nozzle, said ball valve will block said lower seat and prevent vapors from exiting said filler pipe, and after insertion of said fuel nozzle, said carrier will be lifted away from said lower seat to free said ball valve, allowing vapors produced during fuel fill to lift said lightweight ball valve from said lower seat so that said vapors can exit only through said lower seat, carrier opening, upper seat and vent line to said canister, while any liquid fuel rising within said filler pipe to said ball valve will float said ball valve into engagement with said upper seat to block said exit path.

3. In a vehicle fuel system having a fuel tank, a fuel tank filler pipe the upper end of which is openable to atmosphere to receive a liquid fuel filler nozzle, and a vapor storage canister, a vapor venting means to prevent fuel vapors from exiting said fuel tank through said filler pipe to atmosphere, said vapor venting means comprising, a valve housing on said filler pipe below said filler pipe upper end having an interior bounded by a lower wall presented to the interior of said filler pipe and an upper wall spaced from said lower wall, said lower wall further defining a circular lower seat opening to the interior of said filler pipe and said upper wall further defining an opposed circular upper seat opening to the outside of said valve housing, a vapor vent line running from said upper circular seat to said storage canister, a lightweight and buoyant ball valve located in said housing interior intermediate said opposed seats having a diameter that is less than the spacing between said opposed seats, so that said ball valve can close either said lower or said upper seat to block said exit path, but not both simultaneously, a ball valve carrier located in said housing interior intermediate said ball valve and said upper circular seat and guidably movable toward and away from said opposed seats, said carrier having a generally circular central opening therethrough with a circumference less than the greatest circumference of said ball valve, a compression spring biased between said upper housing wall and said carrier so as to trap the outside of said ball valve within said carrier opening and close said lower seat, a lift rod on said carrier extending through said lower housing wall to the interior of said filler pipe, seal means between said lift rod and said lower housing wall to prevent the passage of vapor through said lower housing wall along said carrier lifter, a wiping seal intermediate said valve housing and said filler pipe upper through which said filler nozzle is receivable to block exit of vapors from said filler pipe upper end, and, a flapper door within said filler pipe openable by the insertion of said fuel filler nozzle so as to engage said carrier lift rod only after said inserted nozzle has passed said wiping seal to push said carrier away from said lower seat sufficiently that said ball valve may float into engagement with said upper seat without engaging said carrier, whereby, before insertion of said fuel nozzle, said ball valve will block said lower seat and prevent vapors from exiting said filler pipe, and after insertion of said fuel nozzle, said carrier will be lifted away from said lower seat to free said ball valve, allowing vapors produced during fuel fill to lift said lightweight ball valve from said lower seat so that said vapors can exit only through said lower seat, carrier opening, upper seat and vent line to said canister, while any liquid fuel rising within said filler pipe to said ball valve will float said ball valve into engagement with said upper seat to block said exit path.

* * * * *